United States Patent [19]

Nakamura et al.

[11] 4,443,670
[45] Apr. 17, 1984

[54] ROTARY ENCODER CONTACT DISK

[75] Inventors: Noriaki Nakamura, Shijonawate; Tomio Kishimoto; Yuichi Yamamoto, both of Hirakata, all of Japan

[73] Assignee: Matsushita Electric Industrial Co., Ltd., Kadoma, Japan

[21] Appl. No.: 317,856

[22] Filed: Nov. 3, 1981

[30] Foreign Application Priority Data

Sep. 14, 1979 [JP] Japan .................. 54-118472

[51] Int. Cl.³ ................. H01H 1/58; H01H 19/58
[52] U.S. Cl. .................. 200/11 DA; 200/292
[58] Field of Search ......... 200/11 D, 11 DA, 11 TW, 200/292, 11 G

[56] References Cited

U.S. PATENT DOCUMENTS 4,037,116 7/1977 Hodama ............... 200/11 DA X
4,145,585 3/1979 Iwasaki ............... 200/11 DA

*Primary Examiner*—J. R. Scott
*Attorney, Agent, or Firm*—Cushman, Darby & Cushman

[57] ABSTRACT

A structure and a method for manufacturing a contact disk for detection of angular position and direction includes a concentrically-arranged planar slip-ring like conductive layer at the innermost region of the disk, a first gear-pattern like conductive layer, having outer teeth, at its midway region, and a second gear-pattern conductive layer, having internal teeth at the outermost region of the disk, all formed on an insulative substrate; the gear-pattern conductive layers are both printed at the same time to insure high accuracy in the position of the conductive layers; crossing parts of the lead connections are printed with the use of an insulative film therebetween.

3 Claims, 13 Drawing Figures

FIG. 3a (PRIOR ART WAVEFORM OF THE ROTARY ENCODER)
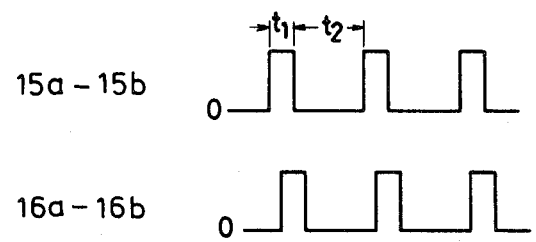
FIG. 3b (PRIOR ART WAVEFORM OF THE ROTARY ENCODER)
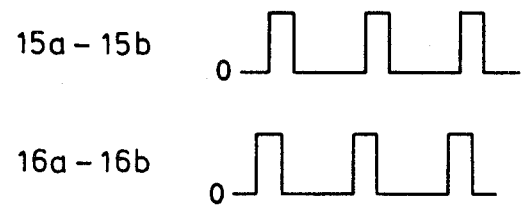

F I G. 5a
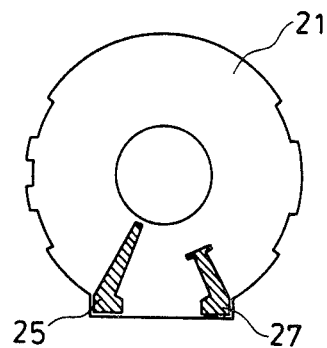
F I G. 5b
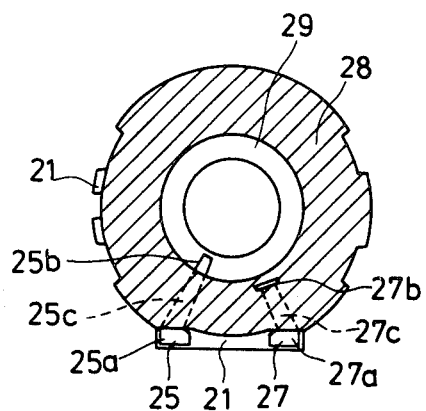
F I G. 5c
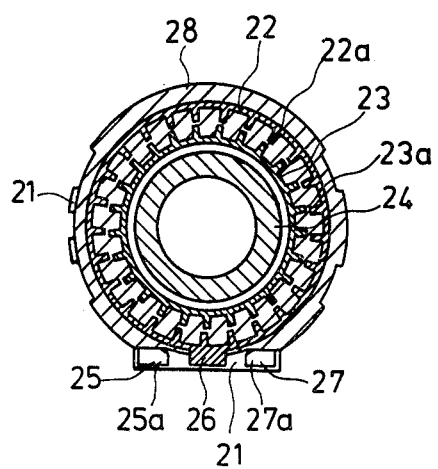

ROTARY ENCODER CONTACT DISK

BACKGROUND OF THE INVENTION

1. Field of the Invention

The present invention relates to a rotary encoder contact disk capable of converting a rotational movement of its axis into a pulse signal to sense the angular position of the axis of the rotary encoder, and to a method for manufacturing the same.

2. Description of the Prior Art

A rotary encoder contact disk has hitherto been generally embodied as a laminated structure comprising at least three conductive layers and two insulating film layers sandwiched between the formers, formed on an insulative substrate. It usually requires at least five printing steps to be completed as shown in the attached drawings and will be discussed first as follows referring to FIGS. 1 to 5.

FIG. 1 is a plan view of the conventional rotary encoder contact disk. In the drawing, a substrate 1 of insulative material has a conductive layer 2 of internal gear-pattern thereon, another conductive layer 3 of ordinary gear-pattern and an annular conductive layer 4 of a planar slip-ring. Numerals 5, 6 and 7 designate terminal parts, in which the terminal parts 5 and 7 are electrically connected to the annular conductive layer 4 and to the gear-pattern conductive layer 3 through conductors embedded beneath an insulative film layer placed over the surface of the contact disk 1, and the terminal part 6 is electrically connected to the internal gear-pattern conductive layer 2 at the surface of the contact disk 1, respectively. Terminals 8, 9 and 10 are electrically connected to the terminal parts 5, 6 and 7, respectively. Regions 11a, 11b, 11c and 11d of the surface of the contact disk 1 other than those occupied by the conductive layers are coated with the insulative film layers.

Numerals 12a' and 12b' indicate spots of the surface of the contact disk 1 over which the tips 12a and 12b of brush 12 are contacting with the conductive layers 2, 3 and 4. The mode of this contacting of the tips 12a and 12b of the brush 12 is shown in a partly cut-out perspective view of FIG. 2. The brush 12 is designed to be able to rotate about an axis which shares the center 13 of the contact disk 1 while its tips 12a and 12b are contacting with the conductive layers 2, 3 and 4. During the rotational movement of a knob attached to the brush 12, the tip 12b of the brush 12 touches upon and separates from the teeth parts 2a and 3a of the gear-pattern conductive layers 2 and 3, one after another.

In the above structured rotary encoder contact disk combined with a circuit 14 shown in FIG. 1, let us suppose a situation wherein the brush 12 is rotated in the counterclockwise direction by manipulating a knob (not shown) attached to the brush 12. The results of the measurements made on a voltage waveform across a resistor $R_1$ (terminals 15a and 15b) and on a voltage waveform across another resistor $R_2$ (terminals 16a and 16b) will be discussed below.

In FIG. 2, while the tip 12b of the brush 12 touches upon the tooth 2a of the internal gear-pattern conductive layer 2 for a time $t_1$ by being rotated in the counter-clockwise direction, the internal gear-pattern conductive layer 2 is electrically connected with the slip-ring like conductive layer 4 through the tooth 2a, brush tip 12b, brush arm 12 and brush tip 12a for the time $t_1$. Incidentally, since the internal gear-pattern conductive layer 2 is electrically connected with the terminal 9 on one hand and the slip-ring like conductive layer 4 is connected with the terminal 8 on the other hand, the conduction between the internal gear-pattern conductive layer 2 and the slip-ring conductive layer 4 will result in a short circuit between the terminals 8 and 9 to create a current flowing through the resister $R_1$ along the direction represented by an arrow in FIG. 1 and a high level voltage across the terminals 15a and 15b for the time $t_1$ as shown in the upper waveform diagram of FIG. 3a.

Next, during a time $t_2$ from a time point of separation of the brush tip 12b from the tooth 2a to that of reaching the next tooth 2b, the voltage across the terminals 15a and 15b will be low level as shown in the upper waveform diagram of FIG. 3a, because the connection between the terminals 8 and 9 is open for the time $t_2$. The upper waveform diagram of FIG. 3a represents the pulse voltage across the terminals 15a and 15b obtained by the succession of the above indicated operations.

On the other hand, the brush tip 12b also contacts with the teeth 3a, 3b, . . . of the gear-pattern conductive layer 3 along with the anticlockwise rotational movement of the brush arm 12. The teeth 3a, 3b, . . . are however slightly shifted in angular position with respect to the teeth 2a, 2b, . . . of the internal gear-pattern conductive layer 2 in the anticlockwise direction, and therefore a current flows through the resistor $R_2$ in the direction represented by an arrow in FIG. 1 to create a voltage across the terminals 16a and 16b represented by a lower waveform diagram in FIG. 3, in a manner to be slightly delayed as compared with that across the terminals 15a and 15b.

On the contrary, if the knob is rotated in the clockwise direction to cause the brush tips 12a and 12b turn in the same direction, the voltage pulses across the terminals 15a and 15b represented by the upper waveform diagram of FIG. 3b will be delayed as compared with that across the terminals 16a and 16b represented by the lower waveform diagram of FIG. 3b.

As indicated above, by counting the numbers of pulses contained in the voltage waveform which appears across the terminals 15a and 15b and across the terminals 16a and 16b by means of a counter or the like, the angular displacement of the knob can be determined. Furthermore, by comparing the positional relationship between the pulses in the voltage waveforms derived from the partial circuit between the terminals 15a and 15b and from that between the terminals 16a and 16b, the direction of the angular displacement of the knob can be found.

As can be apparent from the illustration of the rotary encoder contact disk, it is one of the most important matter to accurately establish the positional relationship between the radially-arranged teeth of the gear-pattern conduction layer 2 and those of the internal gear-pattern conductive layer 3 on the contact disk 1. If the positional relationship is not accurately established, the positional relationships between the pulse waveforms, shown in FIGS. 3a and 3b, respectively, are also impaired to unable the accurate determination of the rotational direction of the rotating knob. Incidentally, the larger the members of the radially-arranged teeth of the gear-pattern conductive layer 2 and 3 and the smaller the periods of pulse output from the encoder are selected, the more accurately can an angular position of the knob be determined. An accurate establishment of the positional relationships between the teeth of the conductive layers 2 and 3 will, however, become increasingly difficult with the increase of the number of the teeth.

In the past, in printing the gear-pattern conductive layers 2 and 3 on the contact disk 1 by means of screen printing process, the both patterns have been printed independently as will be elucidated in the following description referring to FIGS. 4a through 4e inclusive, each of which shows respective steps of the consecutive process. This mode of the printing process is however liable to cause a shear and/or short circuit defect between the teeth. Furthermore, this mode of the process requires a lot of repeated printing steps for forming conductive layers and insulative layers of given pattern. The conventional process will be described by referring to FIGS. 4a through 4e inclusive.

The conventional screen printing process will first be summarized as follows.

(1) Preparing a flat screen having a multiplicity of fine pores evenly over the whole surface thereof, and filling-up the pores in a region other than a region corresponding to the pattern to be printed, with a region or the like paint stopping substance, (2) Applying this flat screen to a substrate on which the pattern is to be printed, and (3) Applying a conductive paint comprising silver powder and the like on a metal mesh laminated on the flat screen and pressing the paint to the flat screen to allow the silver powder paint pass through the pattern region of the flat screen wherein the pores are not filled-in with the resin and let the powder adhere to the surface of the substrate to form a conductive layer of the given pattern.

A process similar to that indicated above can also be performed for forming an insulative layer on the substrate by printing with insulative powder paint on a layer of conductive substrate.

Substrate of a contact disk 1 shown in FIG. 4a is made by cold-press molding of powder of synthetic resin. A slip-ring like conductive layer 4 and a terminal part 5 shown as a hatched part for clarification of pattern in the figure are printed by means of the screen printing process with a conductive paint comprising silver powder or the like at the same time. The slip-ring like conductive layer 4 is electrically connected with the terminal part 5 through a midway part 5c.

In the step shown in FIG. 4b, an insulating layer 17 shown as a fine dotted part in the figure is printed thereon to cover the midway part 5c with the layer 17. The slip-ring pattern conductive layer 4 and the terminal part 5 remain to be exposed after the insulating layer is placed. In the step shown in FIG. 4c, the gear-pattern conductive layer 3 and the terminal part 7 which are shown as hatched parts in the figure are printed by means of the screen printing process. The gear-pattern conductive layer 3 is electrically connected with the terminal part 7 through a midway part 7c formed as continuous part thereto.

In the step shown in FIG. 4d, the midway part 7c is coated with an insulative film 7d. Thereafter, in the step shown in FIG. 4e, the internal gear-pattern conductive layer 2 and the terminal part 6 shown as a hatched part of the figure are printed, simultaneously. Next, as shown by FIG. 1, terminals 8, 9 and 10 are provided on each of the terminal parts 5, 6 and 7 to complete the contact disk.

As indicated above, the conventional method for preparing the contact disk requires the five printing steps; that is, the conductive layer or the insulative layer is printed in the respective steps indicated in each of FIGS. 4a–4e. Furthermore, since the gear-pattern conductive layer 3 and the internal gear-pattern conductive layer 2 are printed independently at the steps shown respectively in FIG. 4c and FIG. 4e, the obtained contact disk is liable to the defects in, for example, a shear in the relative position of the patterns and a short circuit between the teeth.

SUMMARY OF THE INVENTION

It is therefore the primary object of the present invention to provide a rotary encoder contact disk which has an excellent correctness in the positioning of the gear-pattern conductive layers.

The present invention can provide a rotary encoder contact disk capable of detecting the angular position with an improved accuracy.

The present invention also can provide a process for preparing the contact disk having the described advantage with fewer manufacturing steps and therefore with shorter working hours.

As a result of intensive investigation on the process for manufacturing contact disk for use in rotary encoder, the present inventors have found that the printing steps which had hithertofore been required in obtaining a contact disk can be reduced from conventional five steps to three steps, whereby the shear or shift of the gear-pattern conductive layers 2 and 3 can be effectively obviated, and completed the present invention.

According to the present invention, there is provided a rotary encoder contact disk of a laminated structure which comprises;

a substrate of insulative material, a first and second terminal parts of conductive layer with a lead-out terminals at each of outer ends thereof, formed isolated from each other on the surface of said insulative substrate, an insulative film formed partly on the surface of the insulative substrate to cover said terminal parts except for their both ends, a slip-ring of conduction layer formed on the surface of said insulative substrate in a manner to contact with the inner exposed end of the first terminal part, a first gear-pattern conductive layer having outer teeth, formed on said insulative film concentrically with and outside of said slip-ring in a manner to contact with the inner exposed end of said second terminal part, and a second gear-pattern conductive layer having internal teeth, formed on said insulative film concentrically with and outside of said first gear-pattern conductive layer and having an integrally formed terminal part with a lead-out terminal on its outer end, wherein the angular positions of the radially-arranged teeth of said first gear-pattern conductive layer are slightly shifted in the rotational direction of the rotary encoder brush, with respect to those of the corresponding and facing teeth of said second gear-pattern conductive layer.

According to another aspect of the present invention, there is provided a method for manufacturing a contact disk for use in a rotary encoder characterized in that which comprises;

a first step of printing two terminal parts of conductive layer on a substrate of insulative material, a second step of printing an insulative film of a pattern just sufficient for covering only midway parts of said two terminal parts leaving the both ends thereof exposed, a third step of simultaneous printing of a slip-ring of conductive layer at an innermost region, a first gear-pattern conductive layer having outer teeth and a second gear-pattern conductive layer having internal teeth at an outermost region, the slip-ring, a first gear-pattern and a second gear pattern being concentrically-arranged from inside to outside in the stated order on the substrate; wherein an exposed inner end of one of the terminal parts is brought into contact with said slip-ring conductive layer, an exposed inner end of the other of the terminal parts is brought into contact with said first gear-pattern conductive layer, a third terminal part is formed integrally at a part along periphery of said second gear-pattern conductive layer, the angular positions of the radially-arranged teeth of said first gear-pattern conductive layer being shifted in the rotational direction of the rotary encoder brush, with respect to those of the corresponding and facing teeth of said second gear-pattern conductive layer.

The outer exposed ends of the two terminal parts and of the third terminal part may be provided with lead-out terminals for the electrical connections with the outside circuit.

In the following description, the present invention will be elucidated in more detail by way of example, referring to the attached drawings.

BRIEF EXPLANATION OF THE DRAWING

FIGS. 3a and 3b are the waveform diagrams of pulse signals which appear at the terminals of the rotary encoder.

DESCRIPTION OF THE PREFERRED EMBODIMENT

Figure 1:
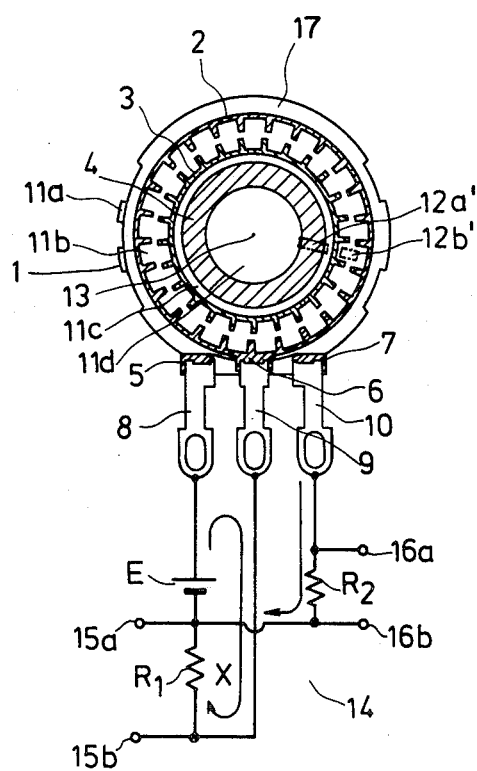
FIG. 1 is the plan view of the conventional rotary encoder contact disk with an associated circuit diagrams therefor.
Figure 2:
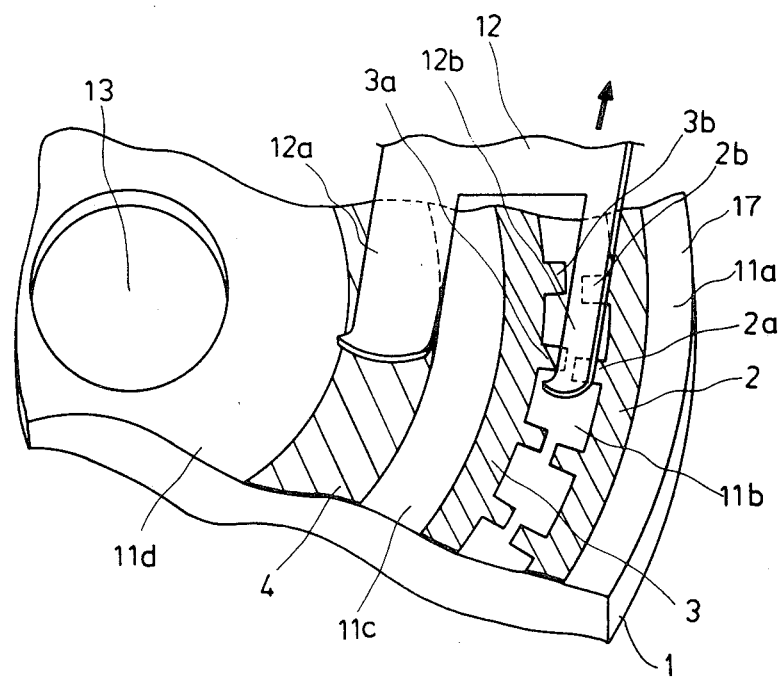
FIG. 2 is the partly cut-out perspective view of the conventional rotary encoder contact disk shown in FIG. 1 and of a part of the rotating brush for use in combination with the contact disk.
Figure 4A:
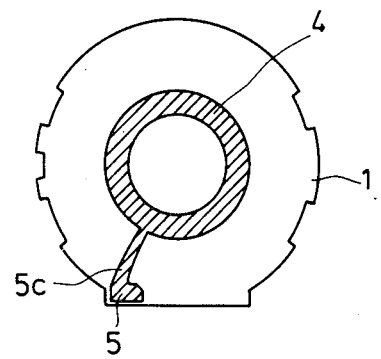
FIGS. 4a–4e, inclusive, are the plan views stepwisely indicating the rotary encoder conventional manufacturing process of the contact disk, stepwisely, and FIGS. 5a–5d, inclusive, are plan views stepwisely indicating a manufacturing process according to one embodiment of the present invention.
Figure 4B:
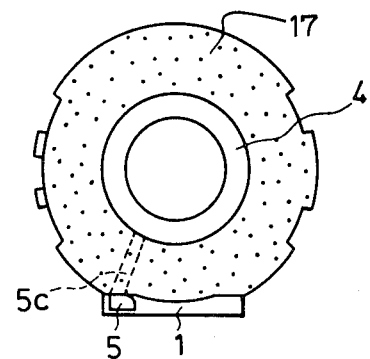
Figure 4C:
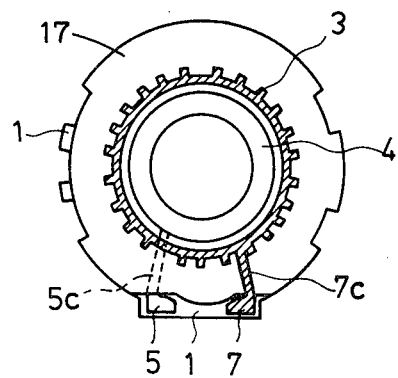
Figure 4D:
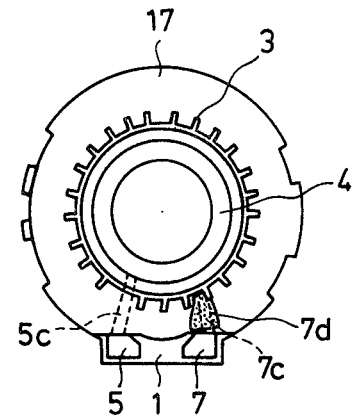
Figure 4E:
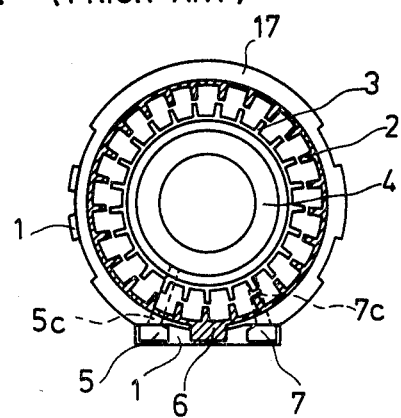

A substrate 21 of an insulative material shown in FIG. 5a is prepared by cold press-molding with synthetic resin powder at first. Two substantially radial pattern terminal parts 25 and 27 shown as hatched parts are simultaneously printed on the substrate 21 by means of known screen printing process with a conductive paint. The inside end of the terminal part 25 lies nearer at center than that of the other terminal part 27.

In a step shown by FIG. 5b, a substantially ring-shaped insulative film 28 indicated as a hatched part is printed thereon by means of known screen printing process, leaving both ends 25a and 25b of the terminal part 25, those 27a and 27b of the terminal part 27; and center circle area 29 intact or uncovered. Accordingly, the midway parts 25c and 27c of the terminal parts 25 and 27 are both covered with the insulative film 28, the inner end 25b of the terminal 25 is exposed in a region inside the ring-shaped insulative film 28, and the inner end 27b of the terminal 27 is exposed through an opening in the ring-shaped insulative film 28.

In a step shown by FIG. 5c, gear-pattern conductive layers 22 and 23, and a slip-ring like conductive layers 24 are printed thereover, with conductive paint. By being so printed, the slip-ring like conductive layer 24, the gear-pattern conduction layer 23 having outer teeth 23a, and the gear-pattern conductive layer 22 having internal teeth 22a are arranged from inside to outside in the stated order. Furthermore, the radially-disposed teeth 22a and 23a of the gear-pattern conductive layers are printed as they are slightly shifted in the rotational direction of the rotary encoder brush.

Figure 5D:
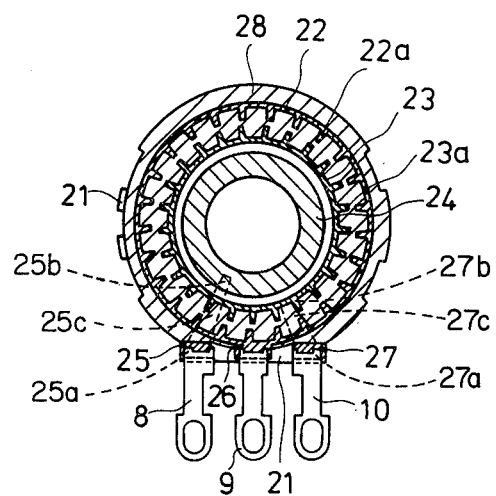

Since the gear-pattern conduction layer 23 is printed on the exposed inner end 27b of the terminal part 27 as shown in FIG. 5b, the conductive layer 23 is brought into contact with the inner end 27b, and hence the gear-pattern conductive layer 23 is electrically connected with the outer end 27a through the inner end 27b and the midway part 27c of the terminal part 27. Similarly, the slip-ring conductive layer 24 is in contact with the inner end 25b of the terminal part 25 as shown in FIG. 5b, and therefore it is electrically connected with the outer end 25a through the midway part 25c thereof. Furthermore, since the gear-pattern conductive layer 22 is in the outermost region of the substrate 21, its terminal part 26 can be provided directly on the conduction layer 22. Finally, when the terminals 8, 9 and 10 are fixed to the terminal parts 25, 26 and 27, respectively as shown in FIG. 5d, and the contact disk is combined with auxiliary parts such as brush, the rotary encoder is completed.

In the above-indicated embodiment of the present invention, conductive layers or an insulating film is printed on the substrate in each of the steps shown in FIGS. 5a–5c. That is, only three printing steps are required for completing the contact disk. It is to be noted that, according to the present invention, the total time required for the process can be reduced by 40% as compared with the conventional process, because two printing steps, each of which takes substantially the same period of time, are dispensed with in the present invention process.

Furthermore, since both of the gear-pattern conduction layers 22 and 23 are printed at the same time by means of a screen plate formed with given patterns kept in an accurate positional relation, the positioning of the gear-pattern conductive layers 22 and 23 on the substrate for each of the contact disks can be dispensed with, and the identical best patterns can always be printed.

Moreover, since only one insulative film is required to be printed on the substrate of the contact disk, smoothness of the film can be maintained to improve the accuracy in the conductive layer printing. Incidentally, in the conventional process, the accuracy in the printing of the conductive layers has been considerably impaired.

What is claimed is:

1. A contact disk for a rotary encoder of the type having a laminated structure and for use with a rotary brush, comprising:
   a substrate of insulative material,
   a first and a second terminal part of conductive material in layer form, each said terminal part having an inner and an outer end and each having a lead-out terminal at said respective outer ends, isolated from each other on the surface of said insulative substrate,
an insulative film formed partly on the surface of said insulative substrate to cover said terminal parts except for their respective ends,
a slip ring conductive layer formed on the surface of said insulative substrate in a manner to contact with the inner exposed end of said first terminal part,
a first gear-pattern conductive layer having teeth extending radially outwardly therefrom and formed on said insulative film concentrically with and outside of said slip ring conductive layer in a manner to contact with the inner exposed end of said second terminal part, and
a second gear-pattern conductive layer having internally radially extending teeth, formed on said insulative film concentrically with and outside of said first gear-pattern conductive layer, said second gear-pattern conductive layer having on its outer edge an integrally formed terminal part with a lead-out terminal, the angular positions of said radially extending teeth of said first gear-pattern being slightly shifted in a rotational direction of the rotary encoder brush with respect to corresponding radially extending teeth of said second gear-pattern.

2. A contact disk of a rotary encoder in accordance with claim 1, wherein said inner end of a first one of said terminal parts lies nearer to the center of said substrate than said inner end of said second one of said terminal parts, said inner end of said first one being exposed in a region inside of said insulative film and said inner end of said second one being exposed through an opening formed on said insulative film.

3. A contact disk of a rotary encoder in accordance with claim 1, wherein said inner end of said first one of said terminal parts lies nearer to the center of the substrate than said inner end of said second one of said terminal parts, said inner end of said first terminal part being exposed in a region inside of said insulative film so as to make an electrical connection with said first gear-pattern conductive layer and said inner end of said second terminal part being exposed through an opening formed in said insulative film so as to make an electrical connection with said second gear-pattern conductive layer.

* * * * *